US009415865B2

(12) United States Patent
Mazarguil

(10) Patent No.: US 9,415,865 B2
(45) Date of Patent: Aug. 16, 2016

(54) AIRCRAFT WHEEL

(71) Applicant: MESSIER-BUGATTI-DOWTY, Velizy-Villacoublay (FR)

(72) Inventor: Nicolas Mazarguil, Velizy-Villacoublay (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 0 days.

(21) Appl. No.: 14/534,339

(22) Filed: Nov. 6, 2014

(65) Prior Publication Data

US 2015/0136899 A1 May 21, 2015

(30) Foreign Application Priority Data

Nov. 15, 2013 (FR) ...................................... 13 61230

(51) Int. Cl.
*B60K 17/00* (2006.01)
*B64C 25/40* (2006.01)
*B64C 25/36* (2006.01)

(52) U.S. Cl.
CPC ............... *B64C 25/405* (2013.01); *B64C 25/36* (2013.01); *Y02T 50/823* (2013.01)

(58) Field of Classification Search
CPC .................. B64C 2025/003; B64C 2025/006; B64C 25/04; B64C 25/36; B64C 25/42
USPC ....... 180/65.51, 385; 244/100 R, 103 R, 111; 301/6.1, 6.2
See application file for complete search history.

(56) References Cited

U.S. PATENT DOCUMENTS

| 3,781,146 A * | 12/1973 | Bates | B64C 25/42 418/175 |
|---|---|---|---|
| 3,785,464 A * | 1/1974 | Collins | B64H 75/425 191/12.2 R |
| 3,874,618 A * | 4/1975 | Bates | B64C 25/42 180/302 |
| 3,977,631 A * | 8/1976 | Jenny | B64C 25/405 188/71.5 |
| 8,857,544 B2 * | 10/2014 | Essinger | B64C 25/405 180/65.51 |
| 2011/0156472 A1 | 6/2011 | Bucheton et al. | |
| 2012/0153075 A1 * | 6/2012 | Wilson | B64C 25/405 244/50 |
| 2013/0026284 A1 * | 1/2013 | Christensen | B64C 25/405 244/50 |
| 2013/0233969 A1 | 9/2013 | Charles et al. | |
| 2014/0246539 A1 * | 9/2014 | Didey | B64C 25/405 244/50 |
| 2015/0137581 A1 * | 5/2015 | Mazarguil | B60B 27/0015 301/6.2 |
| 2015/0210384 A1 * | 7/2015 | Geck | B64C 25/405 244/50 |
| 2015/0210385 A1 * | 7/2015 | Didey | B64C 25/405 244/50 |

FOREIGN PATENT DOCUMENTS

EP 2 361 830 A1 8/2011
EP 2 639 160 A2 9/2013

OTHER PUBLICATIONS

French Search Report for FR 13 61230 dated Jul. 4, 2014.

* cited by examiner

*Primary Examiner* — Toan To
(74) *Attorney, Agent, or Firm* — Sughrue Mion, PLLC

(57) ABSTRACT

An aircraft wheel which is provided with rotational driving unit (110). The driving unit comprises a driving ring (111) which is associated with structure (112) for attaching the ring to a rim of the wheel. The attachment structure is fixed to treads (119) of the rim which further serve to retain removable brake blocks (121) with which the rim is provided.

6 Claims, 2 Drawing Sheets

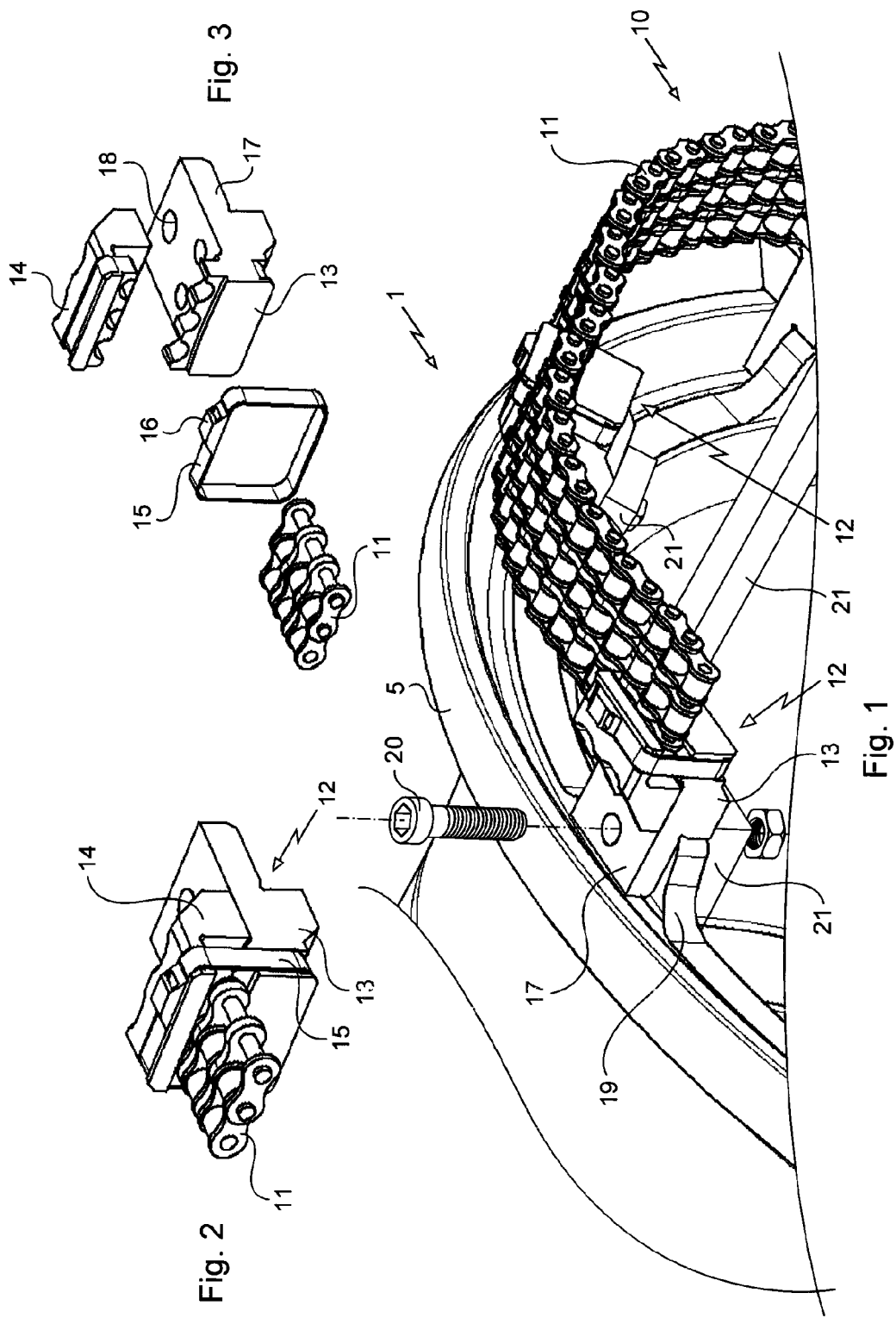

AIRCRAFT WHEEL

The invention relates to an aircraft wheel which is provided with means for the rotational driving thereof by means of a driving actuator.

TECHNOLOGICAL BACKGROUND OF THE INVENTION

The advantage of motorising aircraft wheels in order to be able to move the aircraft without the use of the power units thereof has recently been recognised. In this regard, there are known aircraft wheels which are provided with means for the rotational driving thereof by means of a driving actuator which is fitted to the lower portion of the landing gear. These driving means comprise a toothed ring which is fitted in a rigid manner to the rim of the wheel. Recently, it has been proposed in document EP 2 639 160 to attach a toothed ring to a wheel rim by means of attachment members which have plays which are capable of allowing relative movement between the toothed ring and the rim of the wheel. The toothed ring is fitted to treads which extend from a flank of a rim of the wheel. These arrangements require specific wheels to be produced which must be certified in order to be able to be used on aircraft which are already in service.

OBJECT OF THE INVENTION

The invention relates to an aircraft wheel which is provided with means for the rotational driving thereof which are fitted to the wheel, and which have a simplified construction.

STATEMENT OF THE INVENTION

In order to achieve this objective, there is proposed an aircraft wheel which is provided with rotational driving means, the driving means comprising a driving ring which is associated with means for attaching the ring to a rim of the wheel, in which, according to the invention, the attachment means are fixed to treads of the rim which further serve to retain removable brake blocks with which the rim is provided.

In this manner, use is made of the existence on the braked wheels of treads which serve to retain the brake blocks (these elements serve to fix the rim of the wheel and the rotor discs of the brake in rotation) in order to attach thereto the attachment members of the ring, so that it is possible to use existing wheels without modification or specific effort in terms of certification, since the introduction of the rotational driving torque into the wheel is carried out substantially in the same region as the introduction of the braking torque, and the drive torque is much less significant than the braking torque, which sets out the size of the wheel.

DESCRIPTION OF THE DRAWINGS

The invention will be better understood in the light of the following description of a non-limiting specific embodiment of the invention, with reference to the figures of the appended drawings, in which:

FIG. 1 is a partial perspective view of an aircraft wheel rim showing the attachment of the driving means according to a first embodiment of the invention;

FIG. 2 is a perspective view of a member for attaching the driving means to the rim of FIG. 1;

FIG. 3 is an exploded view of the attachment member of FIG. 2;

DETAILED DESCRIPTION OF AN EMBODIMENT OF THE INVENTION

Figure 4:
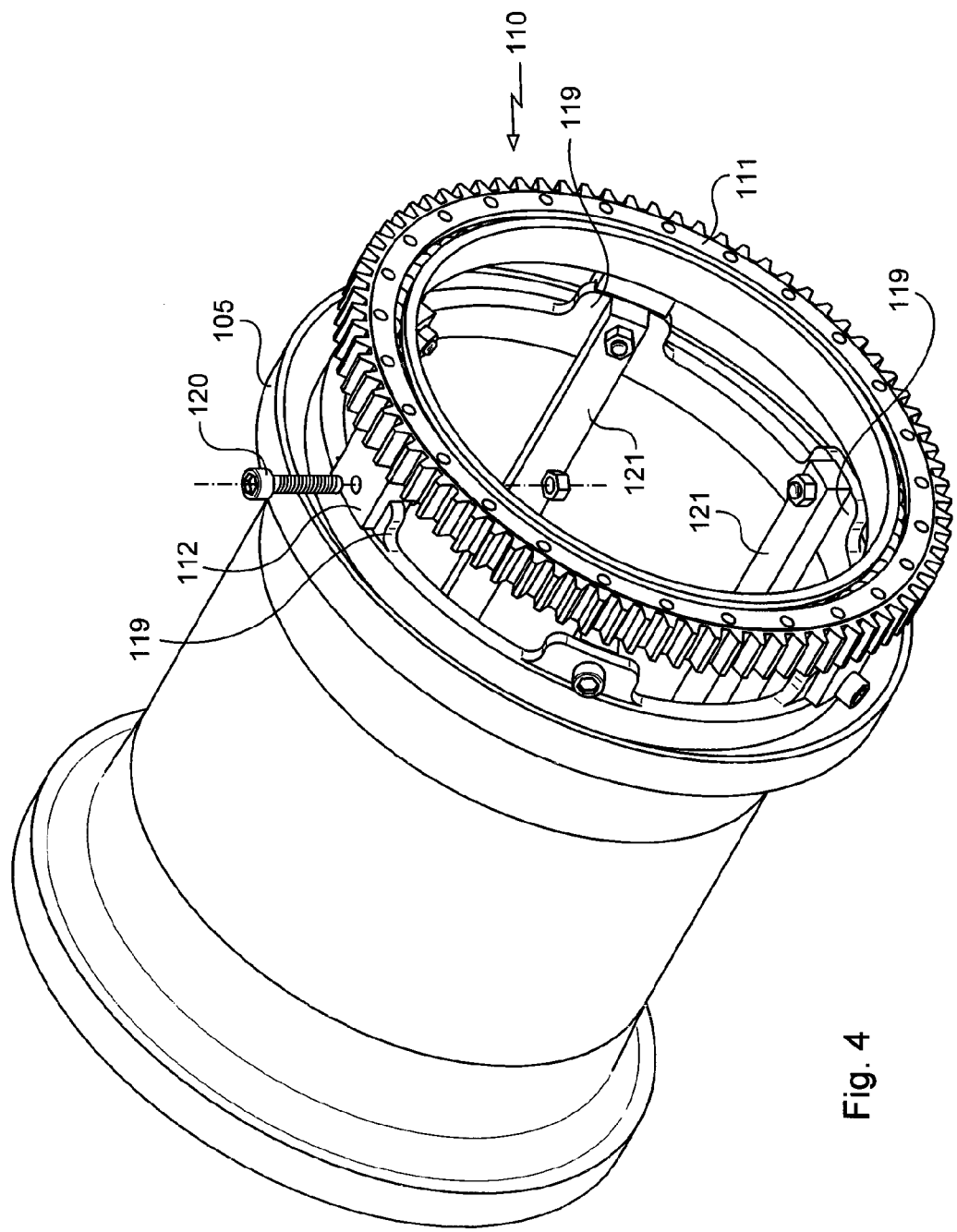
FIG. 4 is a perspective view of an aircraft wheel rim showing the attachment of the driving means according to a second embodiment of the invention.

FIG. 1 shows an aircraft wheel rim 5 which is intended to receive a tyre (not illustrated) and brake discs. The discs extend inside the rim, and some of these discs (the rotor discs) are rotationally driven with the rim by means of blocks 21.

The wheel is provided with rotational driving means 10 which comprise in this instance a chain 11 which is in the form of a ring (in this instance, a chain with three tracks) which is fixedly joined to the rim 5 by means of attachment members 12.

As can be seen more specifically in FIGS. 2 and 3, each attachment member 12 comprises in this instance an internal jaw 13 and an external jaw 14 which have teeth which are shaped to be introduced at one side and the other into links of one of the external tracks of the chain 11, and thus to clamp the links. The jaws 13, 14 are retained in a clamped position on the chain 11 by means of a ligament 15 which is provided with clamping means 16. Alternatively, it is possible to use any other means for retaining the two jaws in position on the chain, such as screws. The lower jaw 13 is extended by a lug 17 which is provided with a hole 18 which allows it to be fixed to a tread 19 of the rim 5 which protrudes from a flank thereof, using a bolt 20.

In accordance with the invention, each of the lugs 17 is fitted directly to a tread 19 of the rim 5 which protrudes from a flank thereof and which further serves to fix a brake block 21 which serves to rotationally drive rotor brake discs (not illustrated in this instance). In this instance, the same bolt 20 fixes both the lug of one of the attachment members and a brake block to one of the treads of the rim.

In FIG. 4, the rim 105 of the aircraft wheel is provided with rotational driving means 110 which comprise a toothed ring 111 (rigid) which comprises attachment members 112 which are in this instance integral with the ring. In accordance with the invention, the attachment members 112 are directly fitted to one of the treads 119 of the rim 105 which protrudes from a flank thereof and which further serves to fix a brake block 121 which ensures the rotational driving of rotor brake discs (not illustrated in this instance).

In this instance, the same bolt 120 fixes both one of the attachment members and a brake block to one of the treads of the rim.

In the two examples illustrated here, the ring of the driving means is intended to cooperate with a drive pinion of an actuation member which is carried by the landing gear on which the wheel is mounted in order to rotate.

In this manner, the fixing of the driving means using the treads which further serve to retain the brake blocks allows the use of standard rims which are already certified, without any modification. Furthermore, if new rims have to be produced, the invention allows a given simplification of the rim compared with that of document EP 2 639 160 by means of the reduction of the number of fixing treads.

The invention is not limited to what has been described above, but instead includes any variant which is included in the scope defined by the claims.

In particular, the ring of the driving means may be of any type since it is fitted to the treads which further serve to retain the brake blocks of the wheel. In the same manner, the fixing of the driving means to the rim may be of any type since the driving means are fixed to the treads which maintain the brake blocks, either directly as illustrated in this instance using the same bolt, or indirectly, for example, by attaching the driving means to the brake blocks, which are themselves fixed to the treads of the rim.

The invention claimed is:

1. Aircraft wheel which is provided with rotational driving means (10; 110), the driving means comprising a driving ring (11; 111) which is associated with means (12; 112) for attaching the ring to a rim of the wheel, the wheel being characterised in that the attachment means are fixed to treads (19; 119) of the rim which further serve to retain removable brake blocks (21; 121) with which the rim is provided.

2. Aircraft wheel according to claim 1, wherein the ring comprises a chain (11) and the attachment members each comprise jaws (13, 14) which are capable of clamping links of the chain.

3. Aircraft wheel according to claim 2, wherein at least one of the jaws comprises a lug (17) which extends in order to enable it to be fixed to one of the treads (19) of the rim.

4. Aircraft wheel according to claim 1, wherein the ring (111) is a rigid toothed ring and the attachment members are integral with the ring.

5. An aircraft wheel which has a rim and is provided with rotational driver (10; 110), the rotational driver comprising:
a driving ring (11; 111);
a plurality of attachment members (12; 112) for attaching the ring to the rim of the wheel,
wherein the attachment members are fixed to treads (19; 119) of the rim which further serve to retain removable brake blocks (21; 121) with which the rim is provided, and
wherein a same bolt (20; 120) extends in order to retain both one of the attachment members of the driving ring and a brake block on one of the treads of the rim.

6. An aircraft wheel comprising:
a rim (5, 105) having a plurality of treads (19, 119) and a plurality of removeable brake blocks (21, 221), and
a rotational driver (10; 110), the rotational driver comprising:
a driving ring (11; 111); and
a plurality of attachment members (12; 112) for attaching the ring to the rim of the wheel,
wherein the attachment members are fixed to the treads (19; 119) of the rim which further serve to retain the removable brake blocks (21; 121) on the rim.

* * * * *